United States Patent
Edler et al.

(10) Patent No.: US 10,807,694 B2
(45) Date of Patent: Oct. 20, 2020

(54) TRACK INTEGRATED WITH RAILS, OUTER MOLD LINE, AND SUPPORT FOR STEP LOADS

(71) Applicant: Bell Helicopter Textron Inc., Fort Worth, TX (US)

(72) Inventors: Joshua Allan Edler, Dallas, TX (US); Tomy Turcotte, Terrebonne (CA); Jean Pierre Paradis, Sainte Therese (CA); Steve Pothier, Blainville (CA)

(73) Assignee: TEXTRON INNOVATIONS INC., Fort Worth, TX (US)

( * ) Notice: Subject to any disclaimer, the term of this patent is extended or adjusted under 35 U.S.C. 154(b) by 358 days.

(21) Appl. No.: 16/001,477

(22) Filed: Jun. 6, 2018

(65) Prior Publication Data
US 2019/0375488 A1 Dec. 12, 2019

(51) Int. Cl.
*B64C 1/14* (2006.01)
*B64C 1/00* (2006.01)

(52) U.S. Cl.
CPC .......... *B64C 1/1438* (2013.01); *B64C 1/0009* (2013.01)

(58) Field of Classification Search
CPC ..... B64C 1/009; B64C 1/1423; B64C 1/1461; B64C 1/1438
See application file for complete search history.

(56) References Cited

U.S. PATENT DOCUMENTS

| | | | |
|---|---|---|---|
| 3,131,892 A * | 5/1964 | Salmun | B64C 1/14 244/129.5 |
| 5,705,006 A | 1/1998 | Roudebush et al. | |
| 6,189,833 B1 * | 2/2001 | Ambrose | B64C 1/1407 244/118.3 |
| 9,358,410 B2 | 6/2016 | Jullie et al. | |
| 2009/0241442 A1 | 10/2009 | MacLean et al. | |
| 2012/0023897 A1 | 2/2012 | DeDe et al. | |
| 2012/0312914 A1 | 12/2012 | Wilson et al. | |

OTHER PUBLICATIONS

Bell 525 Relentless (Product Diagram), Bell Helicopter, A Textron Company; Flight International from Flightglobal Tim Hall (FRAeS, Fort Worth, Texas), Reed Business Information, Published Nov. 12, 2014. (1 page).
Perry, Dominic, "Analysis: Bell 525 Relentless Cutaway and Technical Description", Flight Global, Flight International, Bell Helicopter, Published Nov. 12, 2014. (8 pages).
EPO Search Report issued in EP Application 19150286.3 dated May 24, 2019, 4 pages.
EPO Examination Report issued in EP Application 19150286.3 dated Jun. 28, 2019, 7 pages.
EPO Examination Report issued in EP Application 19150286.3 dated Jun. 18, 2020, 4 pages.

* cited by examiner

*Primary Examiner* — Richard G Davis
(74) *Attorney, Agent, or Firm* — Patent Capital Group

(57) ABSTRACT

In some examples, a track comprises a plurality of members coupled to one another. The plurality of members comprises a first member, a second member, and a third member. The first member is operable to couple the track to an aircraft. The second member forms a first rail. The third member forms a second rail. In addition, the third member comprises at least a portion of an outer mold line of the aircraft. Moreover, the third member is operable to support a step load. The first rail and the second rail are operable to guide movement of an aircraft component along the track.

20 Claims, 13 Drawing Sheets

TRACK INTEGRATED WITH RAILS, OUTER MOLD LINE, AND SUPPORT FOR STEP LOADS

TECHNICAL FIELD

This disclosure relates generally to aircraft systems, and more particularly, though not exclusively, to tracks integrated with rails, an outer mold line, and support for step load.

BACKGROUND

Tracks are sometimes used to operate moveable aircraft components, such as doors, seats, and the like. Such tracks are sometimes placed in locations to avoid damage caused by foot traffic on or in the aircraft. In addition, the tracks are sometimes placed in locations to avoid disrupting an outer mold line (OML) of an aircraft. The OML provides an aerodynamic path for air to flow around the aircraft during flight and generally comprises an outer surface of an aircraft. The OML is an aerodynamic outer surface of the aircraft that reduces aerodynamic drag experienced by the aircraft. The OML comprises many contiguous surfaces of different components.

SUMMARY

In some examples, a track comprises a plurality of members coupled to one another. The plurality of members comprises a first member, a second member, and a third member. The first member is operable to couple the track to an aircraft. The second member forms a first rail. The third member forms a second rail. In addition, the third member comprises at least a portion of an outer mold line of the aircraft. Moreover, the third member is operable to support a step load. The first rail and the second rail are operable to guide movement of an aircraft component along the track.

In other examples, a system comprises an aircraft component and a track. The track comprises a plurality of members coupled to one another. The plurality of members comprises a first member, a second member, and a third member. The first member is operable to couple the track to an aircraft. The second member forms a first rail. The third member forms a second rail. In addition, the third member comprises at least a portion of an outer mold line of the aircraft. Moreover, the third member is operable to support a step load. The first rail and the second rail are operable to guide movement of an aircraft component along the track.

In other examples, an aircraft comprises a door and a track. The track comprises a plurality of members coupled to one another. The plurality of members comprises a first member, a second member, and a third member. The first member is operable to couple the track to an aircraft. The second member forms a first rail. The third member forms a second rail. In addition, the third member comprises at least a portion of an outer mold line of the aircraft. Moreover, the third member is operable to support a step load. The first rail and the second rail are operable to guide movement of the door along the track.

DETAILED DESCRIPTION

Figure 1A:
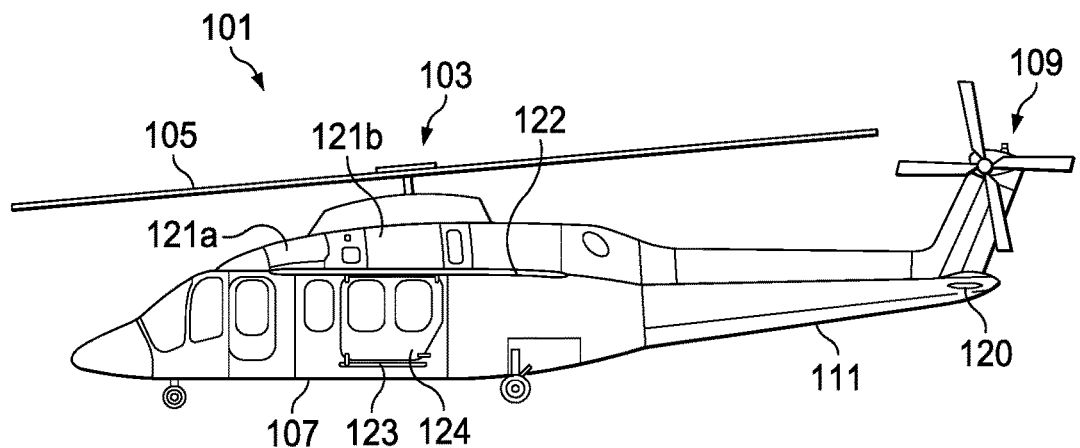
FIGS. 1A, 1B, and 2 illustrate example aircraft in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will be appreciated that in the development of any actual embodiments, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for simplicity and clarity and does not in itself dictate a relationship between the various embodiments and/or configurations discussed.

Example embodiments that may be used to implement the features and functionality of this disclosure will now be described with more particular reference to the attached Figures.

Figure 1B:
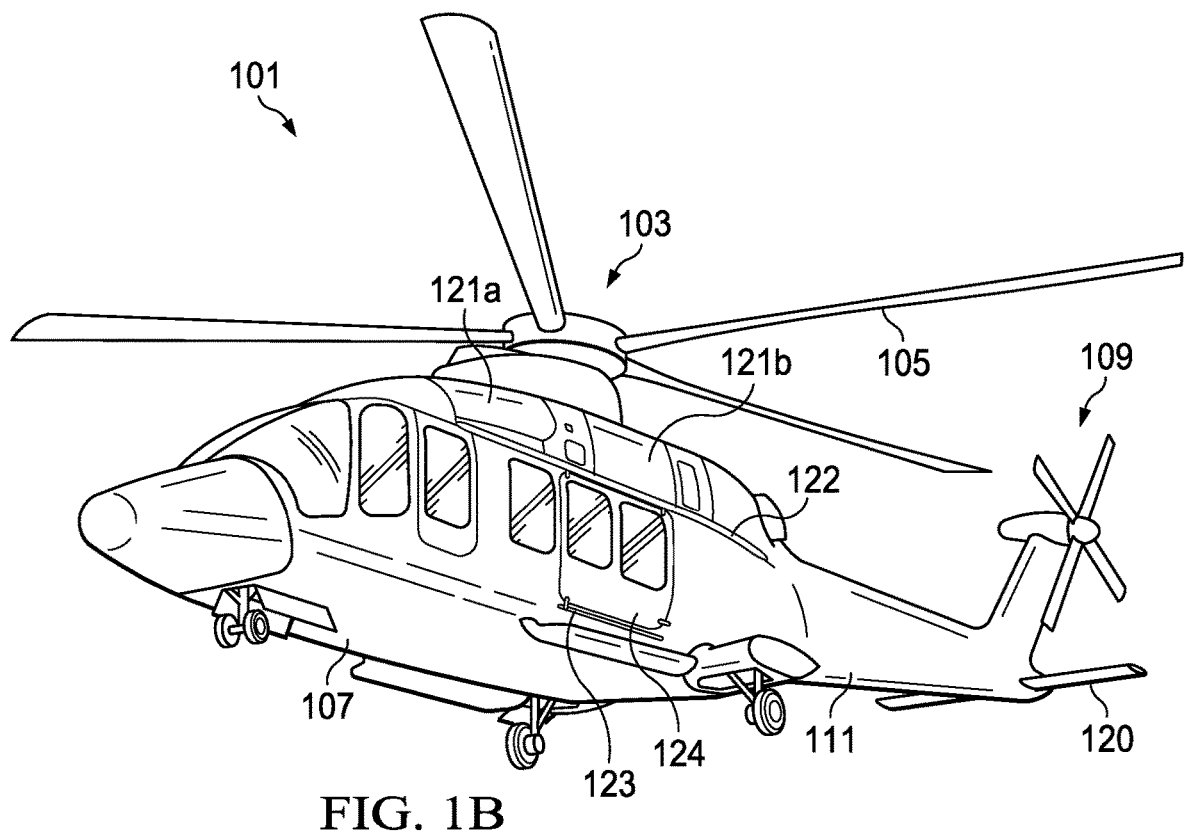

FIGS. 1A and 1B illustrate an example of an aircraft, which in this case is a rotorcraft 101. FIG. 1A illustrates a side view of the rotorcraft 101, while FIG. 1B illustrates a perspective view of the rotorcraft 101. Rotorcraft 101 includes an airframe (hidden beneath the outer mold line of the rotorcraft) and a rotor system 103 coupled to the airframe. The rotor system 103 comprises with a plurality of rotor blades 105. The pitch of each rotor blade 105 can be managed or adjusted to selectively control direction, thrust, and lift of the rotorcraft 101. Rotorcraft 101 further includes a fuselage 107, tail rotor or anti-torque system 109, an empennage 111, and a tail structure 120, each of which is attached to the airframe. The tail structure 120 may be used as a horizontal stabilizer. Torque is supplied to rotor system 103 and anti-torque system 109 using at least one engine. The rotorcraft 101 also includes a door 124, tracks 122 and 123 which couple the door 124 to the rotorcraft 101, and a variety of cowling assemblies configured to cover or protect components of the rotorcraft 101 and reduce aerodynamic drag. The tracks include rails which guide the movement of the door 124 along the track. The door 124 can move between an open position and a closed position.

It should be appreciated that the rotorcraft 101 of FIGS. 1A and 1B is merely illustrative of a variety of aircraft that can be used to implement embodiments of the present disclosure. Other aircraft implementations can include, for example, tiltrotors, fixed wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

The track 122 is configured to support the door 124 and to guide movement of the door 124 to open in a first direction and/or to close in a second direction. Because the track 122 lies in an area of the aircraft nearby internal compartments of the rotorcraft such as those enclosed by fairings 121a and 121b, the track 122 will experience frequent foot traffic. Such foot traffic can potentially damage the track 122. For example, a person standing on the track 122 to access a compartment under the fairing 121b could damage rails included in the track 122, which would reduce the structural integrity and inhibit tracks rails ability to guide the door. Such damage may comprise, as an example, gouges and/or deformations in a surface of the track 122 and/or thinning of track 122 caused by abrasive debris in a shoe or boot. One potential solution is to add a separate, independent piece to protect the track 122. However, doing so would increase the complexity and the part count on the rotorcraft 101. Accordingly, there is a need for a solution that not only protects the track 122 and also maintains simplicity to not increase the complexity of components in and assembly of the rotorcraft 101.

A solution disclosed herein includes a track that provides an outer mold line surface that serves as a step and that is configured to guide movement of an aircraft component. The embodiments described throughout this disclosure address the above challenges (and others) and provide numerous technical advantages including that the track is integrated with an outer mold line surface which also serves as walking surface with structural capacity for supporting step loads, and rails to guide movement of an aircraft component. For example, the track 122 includes rails to guide movement of the door 124 and one or more surfaces that are part of an outer mold line (OML) of the rotorcraft 101 and can also support step loads and/or walking loads.

Example embodiments that may be used to provide an outer mold line surface that serve as a step and guide movement of an aircraft component are described below with more particular reference to the remaining Figures.

Figure 2:
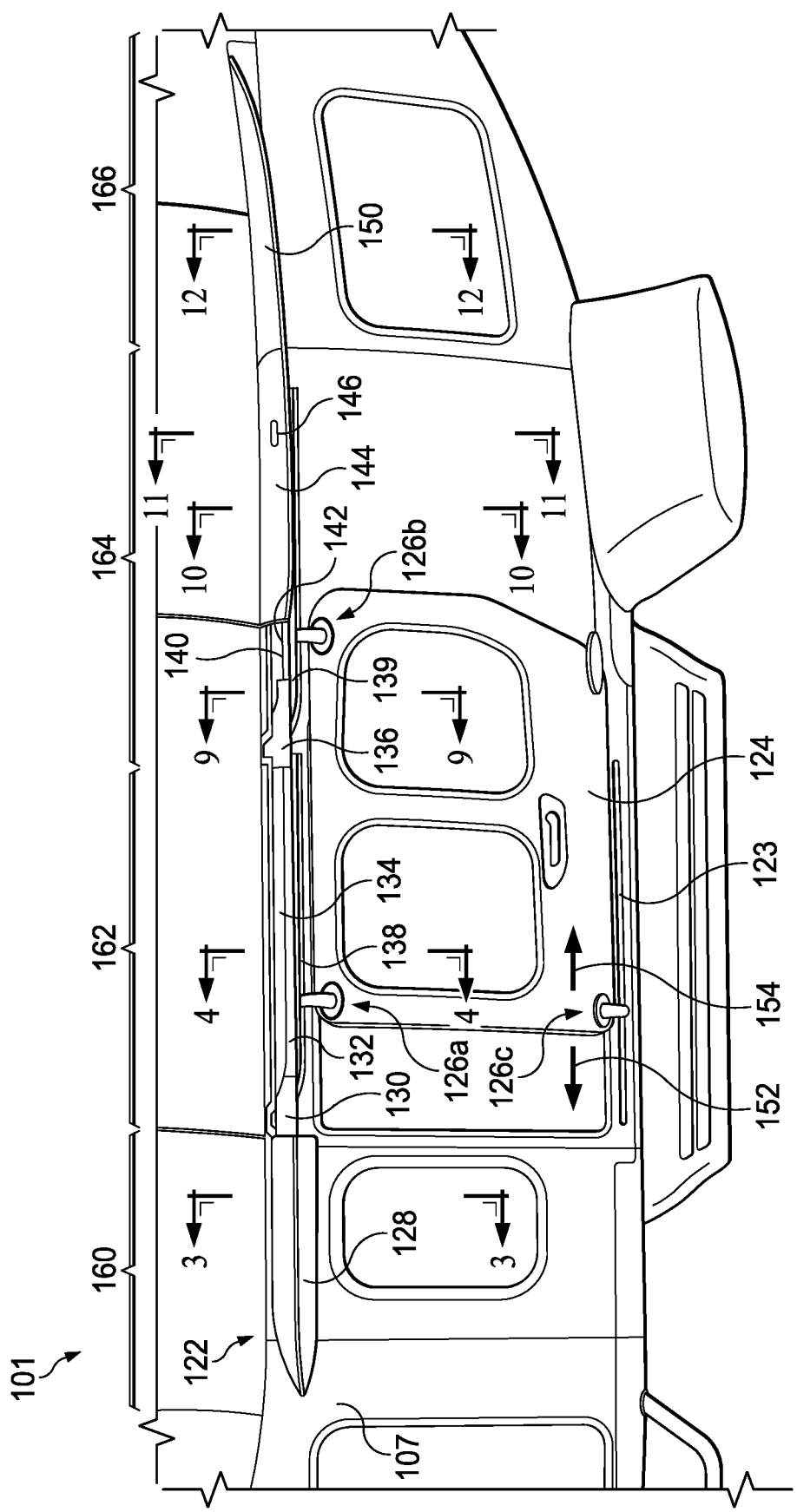
Figure 3:
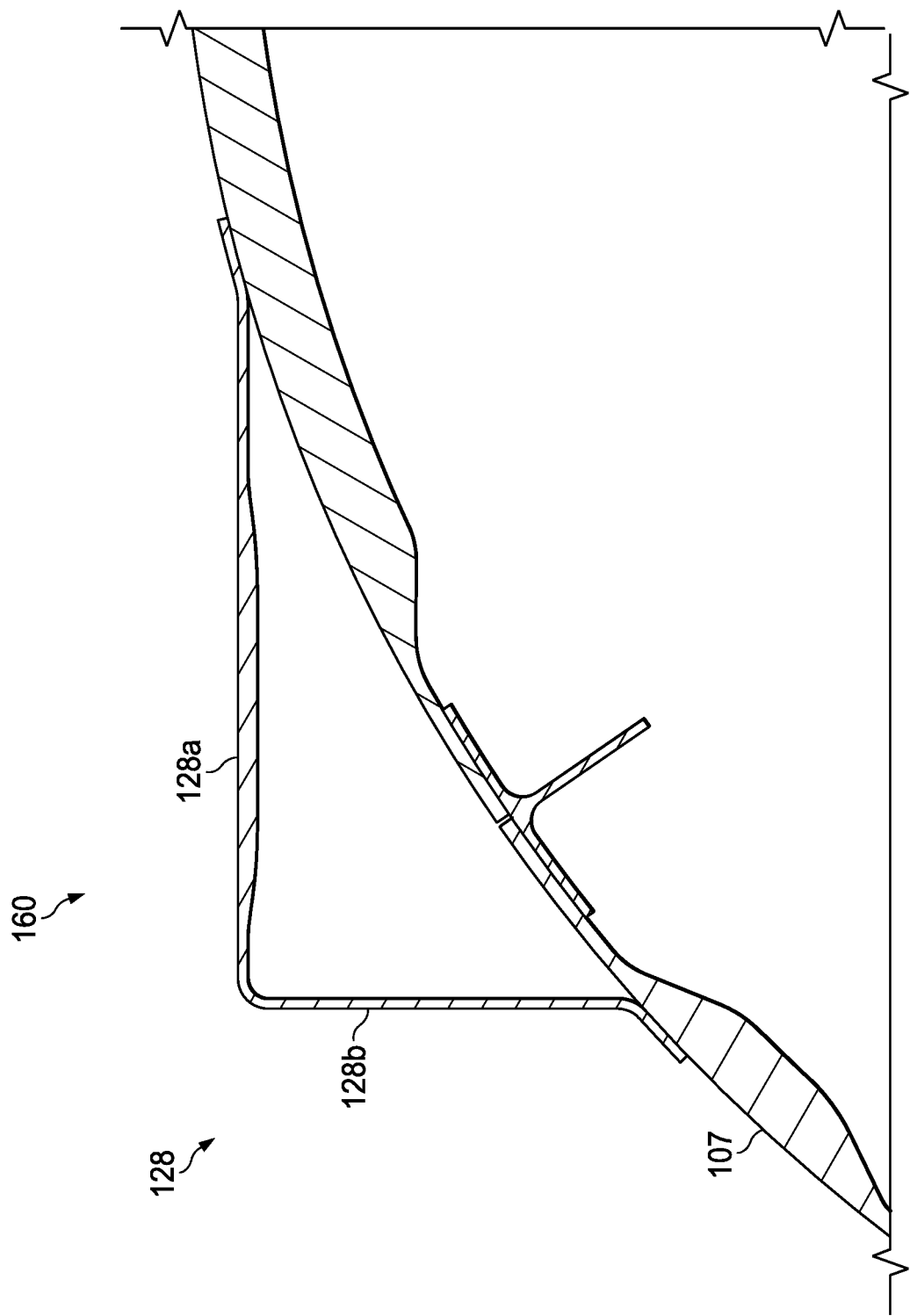
FIGS. 3, 4, and 5 are cutaway views of portions of a track in accordance with certain embodiments.
Figure 4:
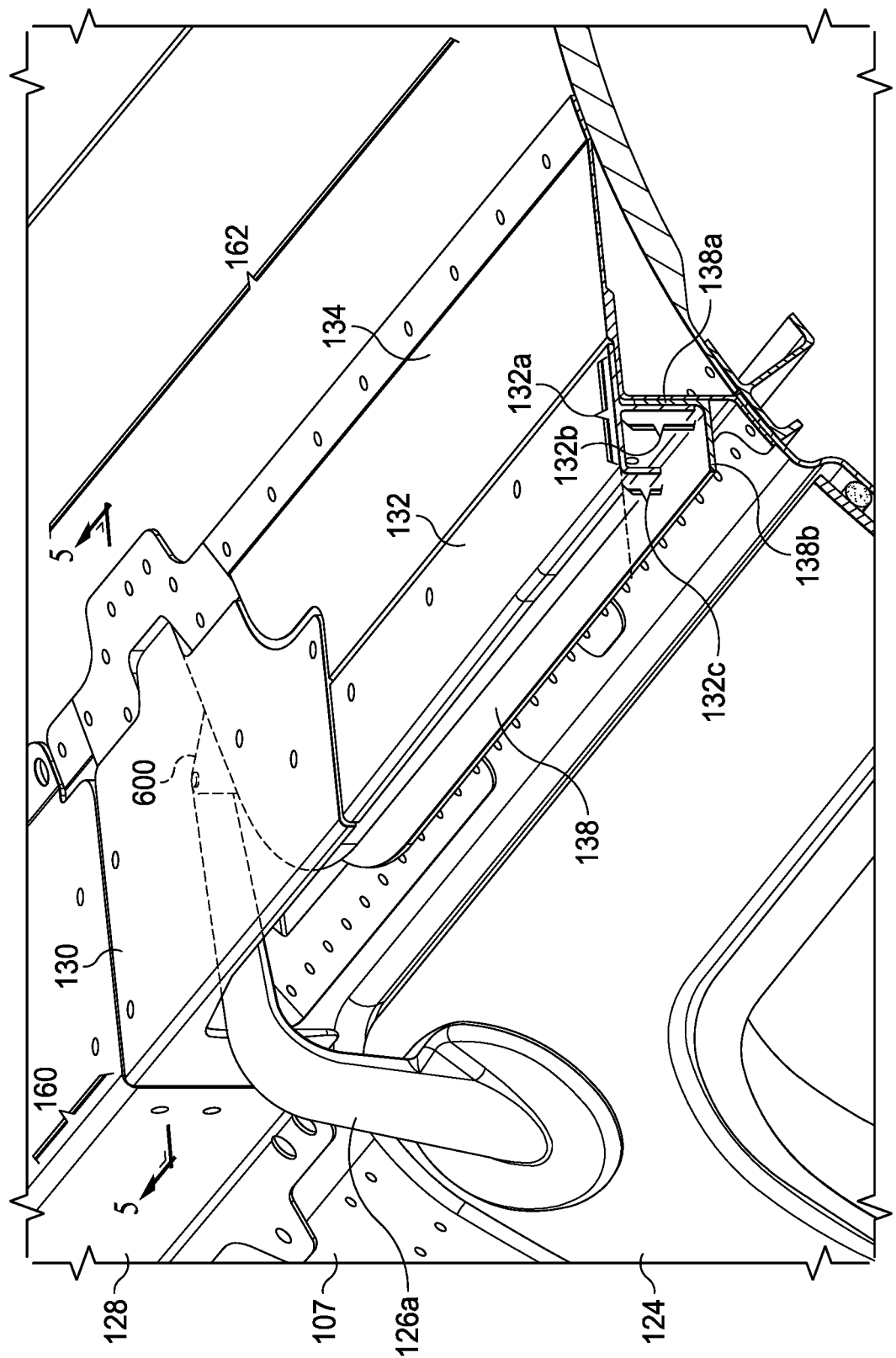
Figure 9:
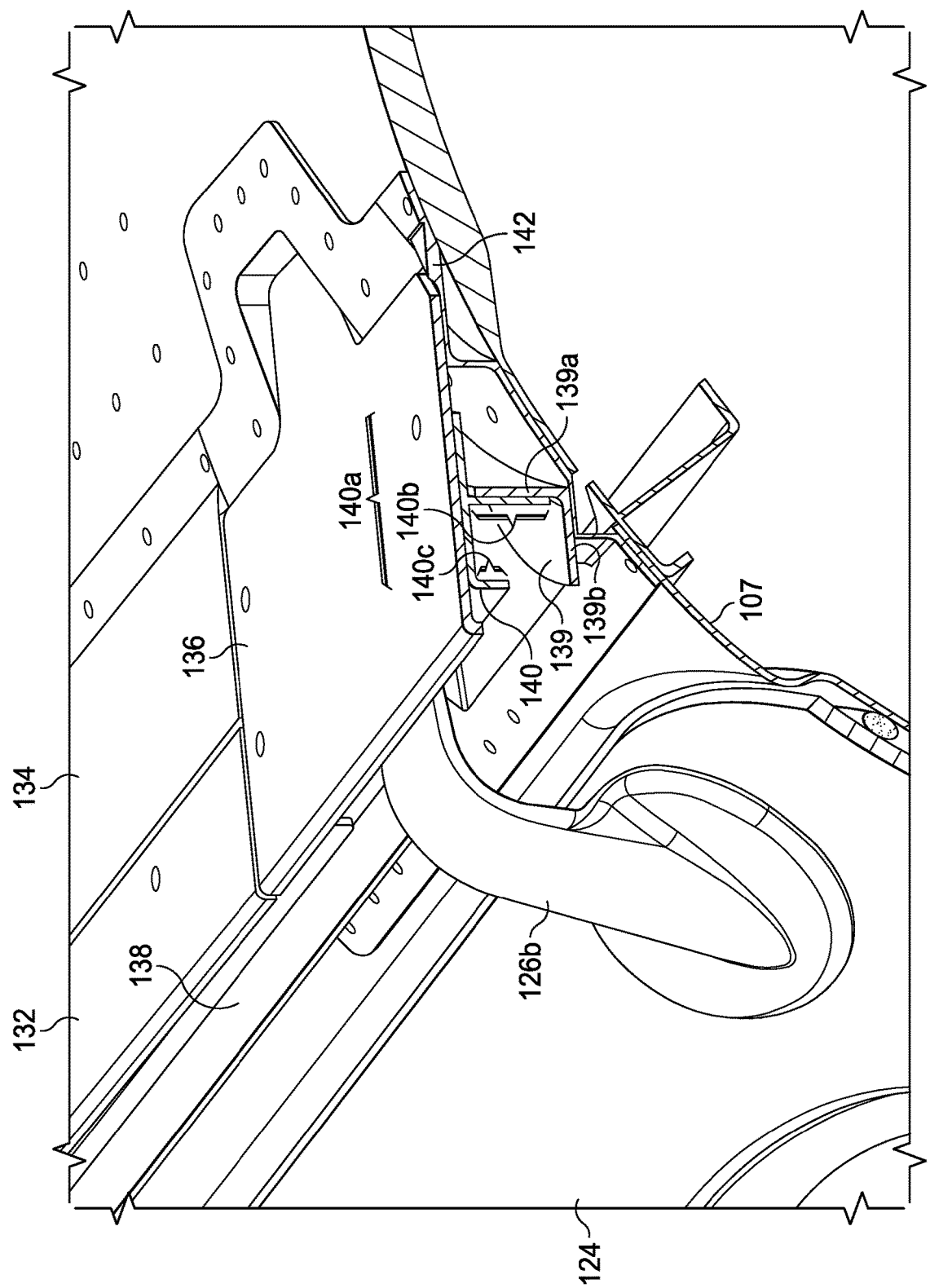
FIGS. 9, 10, 11, and 12 are cutaway views of additional portions of the track in accordance with certain embodiments.
Figure 10:
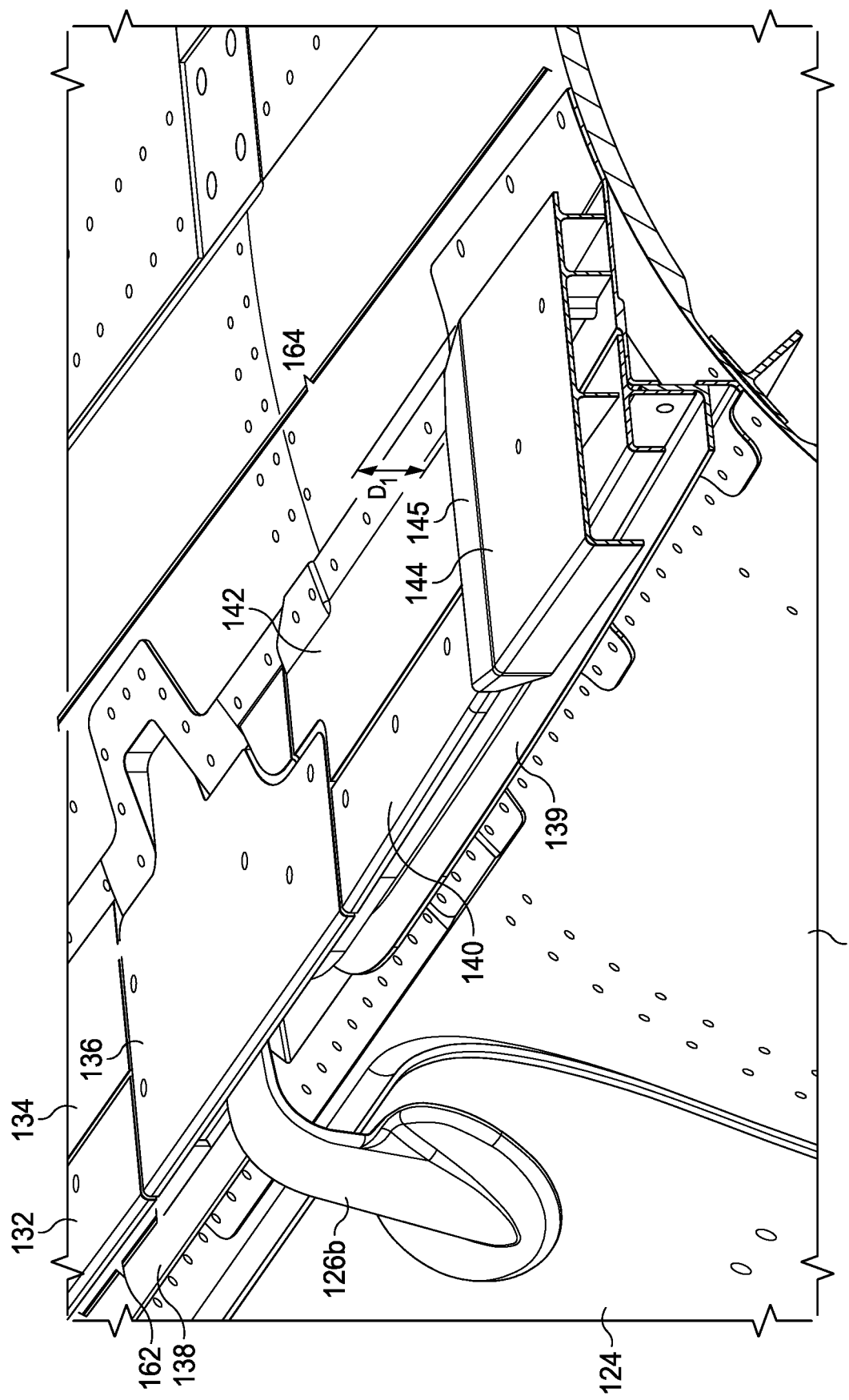
Figure 11:
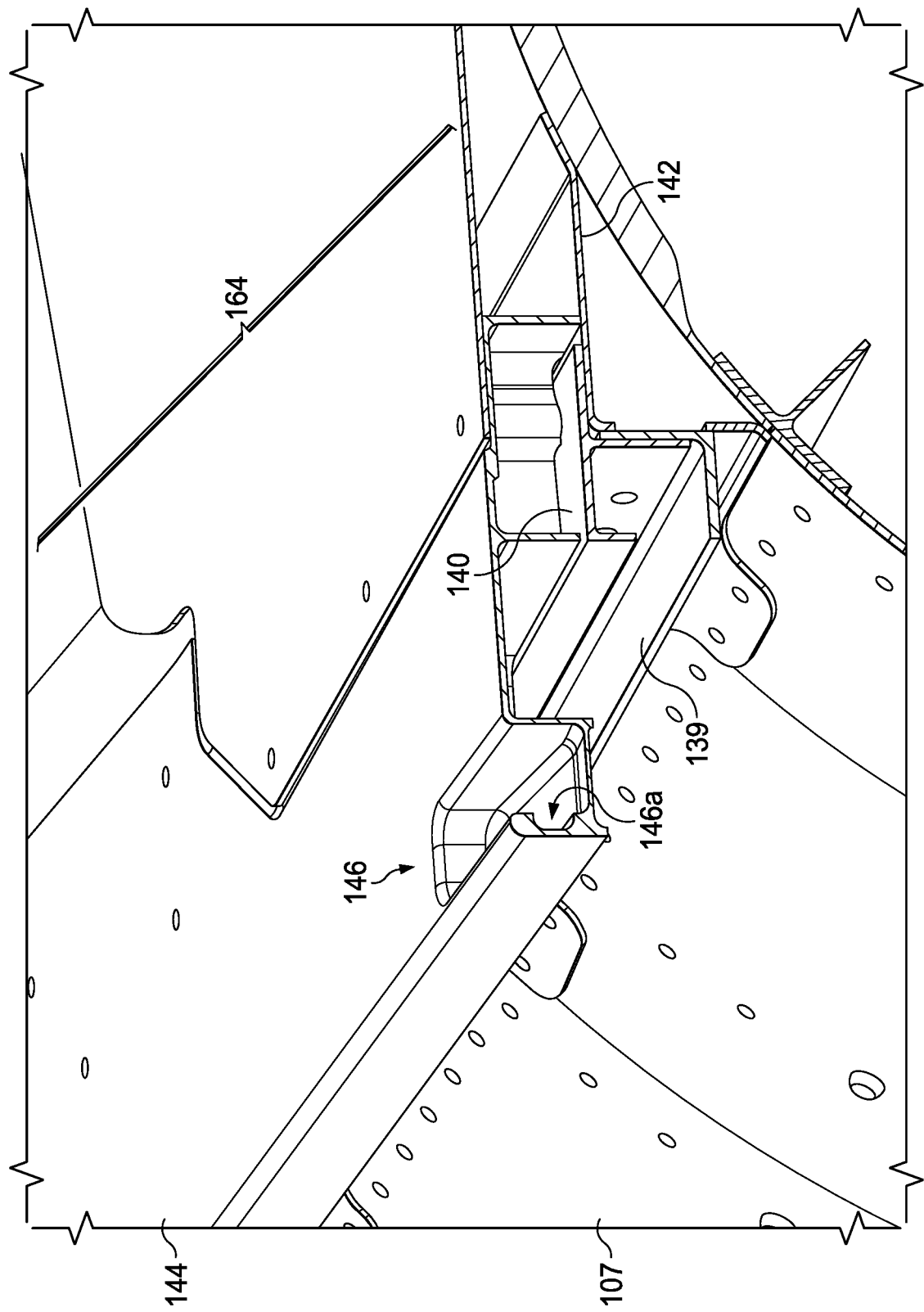
Figure 12:
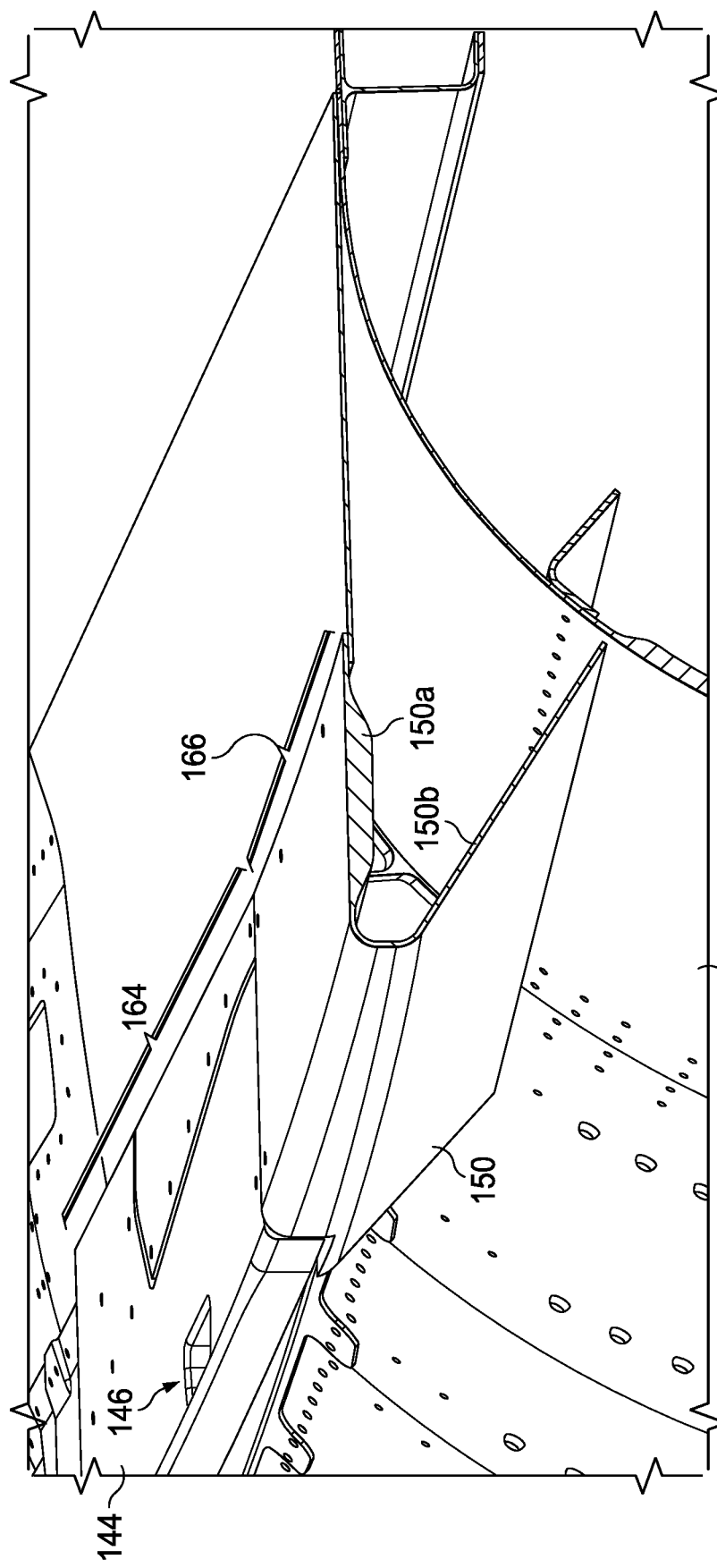

FIG. 2 illustrates further details of a side of the rotorcraft 101 of FIGS. 1A and 1B including the door 124, the tracks 122 and 123, and arms 126a, 126b, and 126c. The door 124 is illustrated in a position between the open position and the closed position. The arms 126a and 126b couple the door 124 to the track 122. The arm 126c couples the door 124 to the track 123. Each of the arms 126a, 126b, and 126c couple the door 124 to their respective tracks via a roller assembly (not visible). The track 122 extends along a length of the rotorcraft 101 from a forward end to an aft end of the rotorcraft 101. The track 122 comprises a plurality of members organized in different portions of the track 122. The portions include a first end portion 160, a first medial portion 162, a second medial portion 164, and a second end portion 166. Each of the portions of the track 122 includes aerodynamic surfaces which also are operable to support step loads. Some of the portions of the track 122 also include rails to support the arms and the door. Each of the portions is coupled to the rotorcraft 101 and to an adjacent portion. The end portions flank the middle portions. The first end portion 160 is located near the forward end of the rotorcraft 101 and comprises a member 128. The second end portion 166 is located near the aft end of the rotorcraft comprises a member 150. The first end portion 160 and the second end portion 166 are on opposite ends of the track 122. FIGS. 3 and 12 illustrate further details of the first end portion 160 and the second end portion 166 respectively from a viewpoint as generally indicated by corresponding arrows in FIG. 2. The first medial portion 162 comprises an assembly including members 130, 132, 134, and 138. The second medial portion 164 comprises an assembly including members 136, 139, 140, 142, and 144. The two medial portions are similar and, for example, the members 130, 132, 134, and 138 generally correspond to the members 136, 139, 140, 142 respectively. The second medial portion 164 comprises an additional member, member 142, which has no corollary in the first medial portion 162. In addition, the second medial portion 164 includes a handhold 146 to help a person to reach the elevation of the track 122. FIG. 4 is a cutaway view of the first medial portion 162 from a viewpoint as generally indicated by corresponding arrows in FIG. 2. FIGS. 5, 6, 7A, 7B, 8A, and 8B illustrate further details of the first medial portion 162. FIGS. 9, 10, and 11 are cutaway views of the second medial portion 164 from a viewpoint as generally indicated by corresponding arrows in FIG. 2.

FIG. 3 is a cutaway view showing a cut through the member 128 of the first end portion 160 of the track 122. The door 124 is illustrated in the closed position. The member 128 is attached by fasteners to the fuselage of the rotorcraft 101. The member 128 forms a portion of the outer mold line of the rotorcraft 101. As is shown in FIG. 2, the member 128 tapers toward its forward end to create an aerodynamic surface to reduce drag associated with the track 122. In addition, as is shown in FIG. 3, a top surface 128a of the member 128 is reinforced to support step loads. For example, the top surface 128a is thicker than the side surface 128b. The aft end of the member 128 is fastened to the first medial portion 162 of the track 122.

Figure 5:
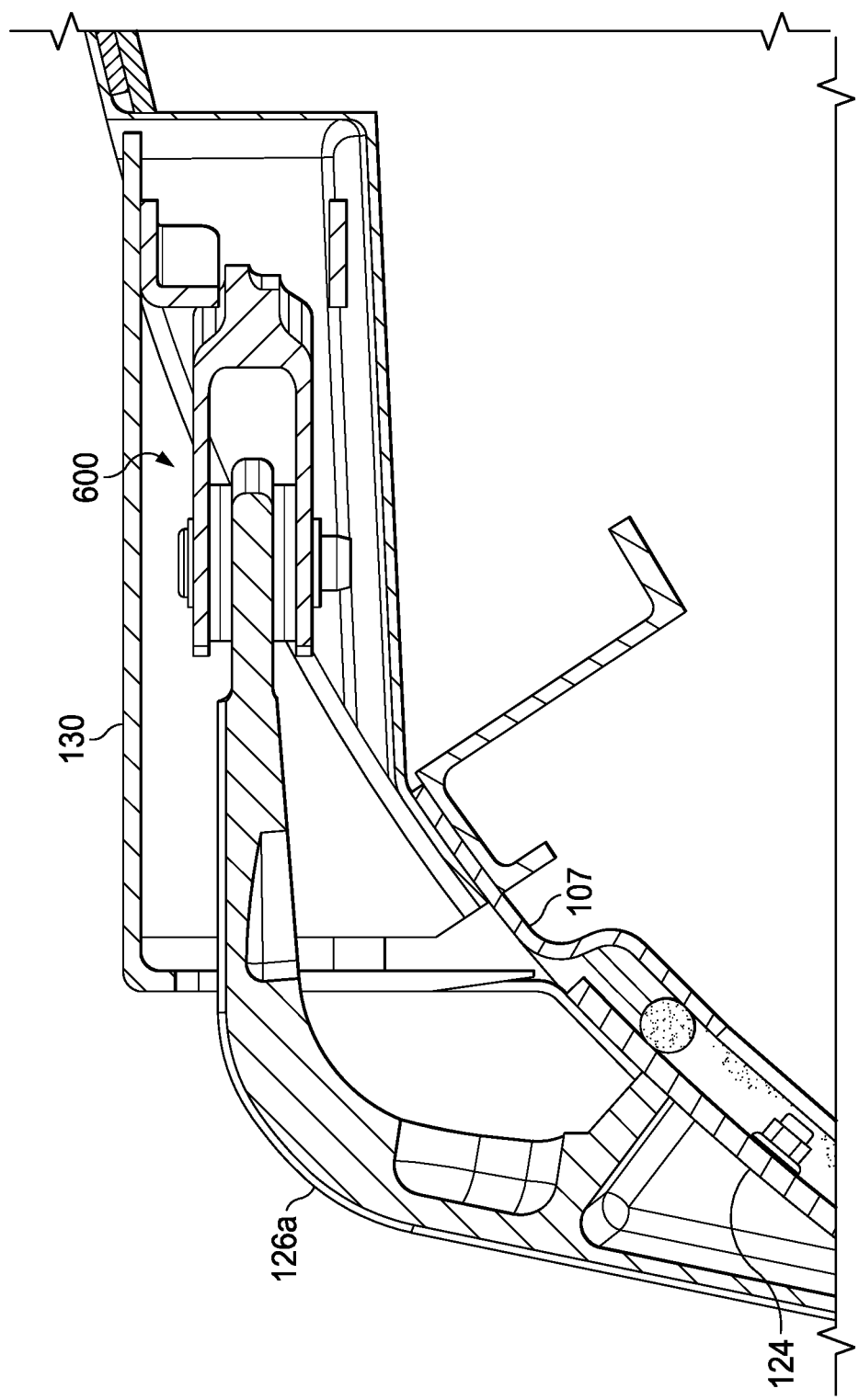

FIG. 4 is a cutaway view of the first medial portion 162 of the track 122. FIG. 5 is a section view of the track 122, the arm 126a, a roller assembly 600 from a viewpoint as generally indicated by the arrows labeled "FIG. 5" in FIG. 4. The first medial portion 162 comprises an assembly including the members 130, 132, 134, and 138. The member 134 is fastened to the fuselage 107 of the rotorcraft and provides support for the members 132 and 138. The member 138 is an angle section comprising two flanges that are approximately perpendicular to one another. A first flange of the member 138 is attached to and enclosed between the members 132 and 134. A second flange of the member 138 extends outward from the member 134 and forms a lower rail for supporting the roller assembly 600. The member 132 is a T-shaped section comprising a top flange 132a, a medial flange 132b, and a reinforcing flange 132c. The top flange 132a and the medial flange 132b are approximately perpendicular to one another. The reinforcing flange 132c extends from an edge of the top flange 132a and reinforces the top flange 132a. The top flange 132a is attached to a top surface of the member 134. The medial flange 132b is attached to a side surface of the member 134 and a flange of the member 138. The top flange 132a of the member 132 forms an upper rail for supporting the roller assembly 600. The lower rail and the upper rail are approximately parallel to one another. The reinforcing flange 132c increases the load bearing capacity of the member 132 and partially encloses a channel into which the roller assembly 600 nests.

The roller assembly 600 nests into the rails in the track 122. The arm 126a is attached to the door 124 at one end and is pivotally coupled to the roller assembly 600 at an opposite end. The weight of the door 124 is supported in part by the arm 126a as well as other arms, such as arms 126b and 126c. The weight is transferred from the arm 126a to the track 122 via the roller assembly 600. The roller assembly 600 is operable to move along a length of the track 122. The rails of the track 122 curve inboard to facilitate closing the door 124 by bringing it into contact with the fuselage 107 and/or opening the door by withdrawing the door from the fuselage 107. This curvature forms a gap into which the roller assembly and the arm nest when the door 124 is in the closed position. The member 130 bridges the gap, which lies between the first end portion 160 and the first medial portion 162, and is fastened to the members 128, 132, and 134. Top surfaces of the members 130, 132, and 134 are coplanar with the top surface of the member 128 and provide an aerodynamic surface, which forms a portion of the outer mold of the rotorcraft 101. Advantageously, the members 130, 132, 134, and 138 form a set of rails operable to guide movement of the door 124, provide structural support for step loads, and form the aerodynamic surface, which reduces drag associated with the track 122.

Figure 6:
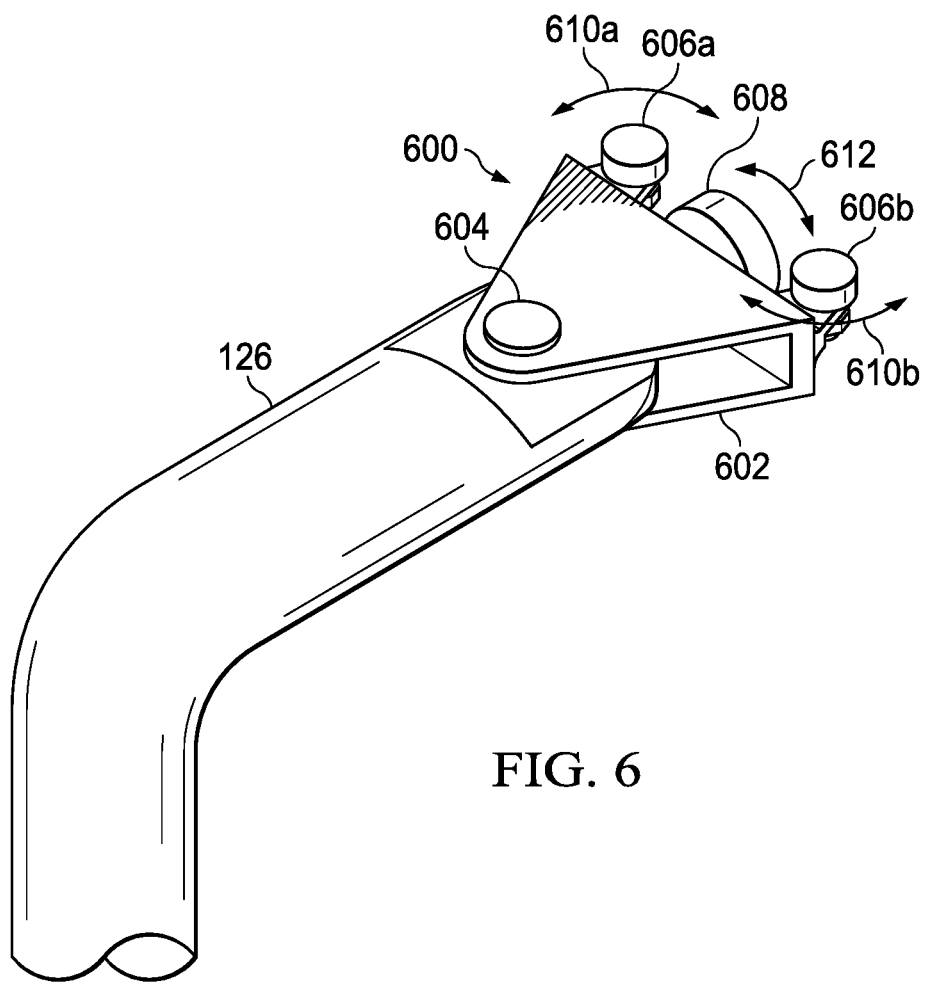
FIGS. 6, 7A, 7B, 7C, 8A, and 8B illustrate a roller assembly and arm supported by a track in accordance with certain embodiments.

FIG. 6 illustrates further details of the roller assembly 600 which is coupled to the arm 126. The arm 126 in FIG. 6 may be any of the arms 126a, 126b, and/or 126c of FIG. 2, each of which supports the door 124. The roller assembly 600 includes a frame 602, a pivotal attachment 604, and rollers 606a, 606b, and 608. The pivotal attachment 604 is a pivotal bearing, which to pivotally attach the frame 602 and the arm 126. The pivotal attachment 604 enables the frame 602 and the arm 126 to pivot with respect to one another about a pivotal axis of the pivotal attachment 604, which is this case is a vertical axis aligned with the center of pivotal attachment 604. The pivotal attachment 604 may comprise a nut and bolt or any other attachment mechanism operable to couple the frame 602 and the arm 126 while enabling relative motion between the frame 602 and the arm 126. The rollers 606a, 606b, and 608 are attached to the frame 602. The rollers 606a and 606b are coupled to respective flanges of the frame 602 and contain bearings that enable rotation in the directions 610a and 610b respectively. The roller 608 is coupled to the frame 602 and contains bearings that enable rotation in the directions 612, which is perpendicular to the directions 610a and 610b. The rollers 606a, 606b, and 608 nests in a channel formed by the members 132 and 138 of the track 122 and rotate to facilitate moving the roller assembly and the arm 126 along the track 122. When the roller assembly 600 is nested in the track 122, the rollers 606a and 606b bear against the medial flange 132b of the member 132 and the roller 608 bears against the lower rail. The roller 608 supports the vertical load of the weight of the door 124.

FIGS. 7A, 7B, 7C, 8A, and 8B illustrate views of the roller assembly 600 nested in the track 122 where the track curves inboard on the rotorcraft 101 under the member 130. The rollers 606a, 606b, and 608 of the roller assembly 600 are partially enclosed by the members 132 and 138 of the track 122.

Figure 7A:
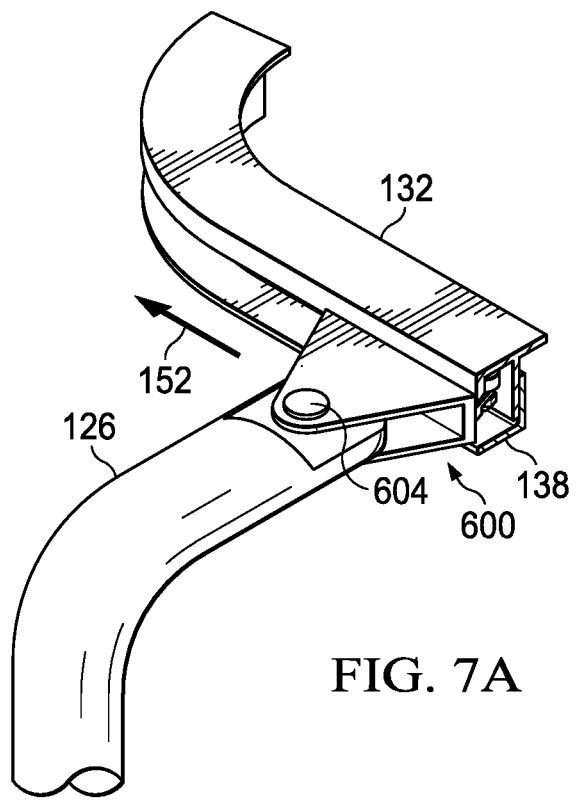
Figure 7B:
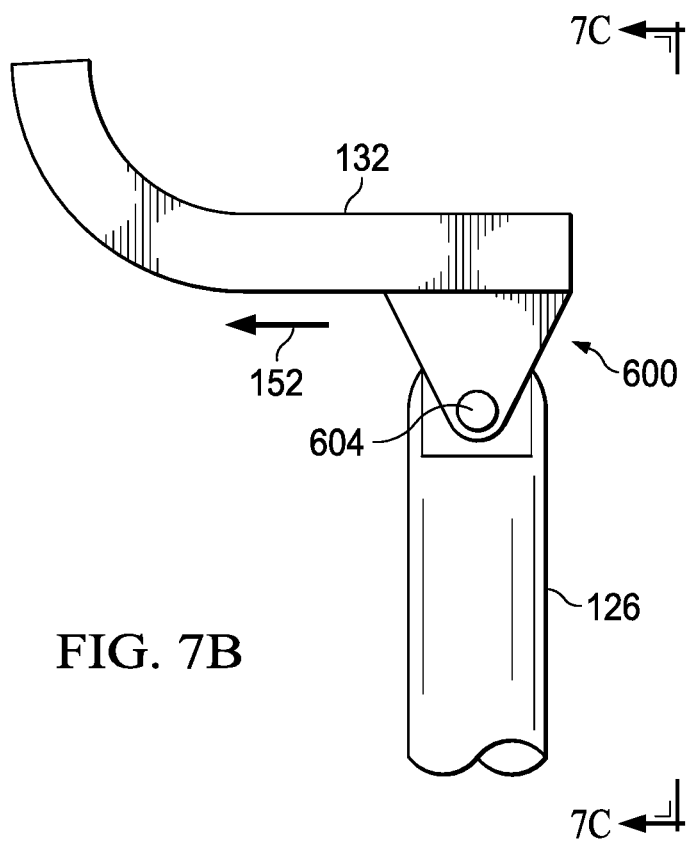
Figure 7C:
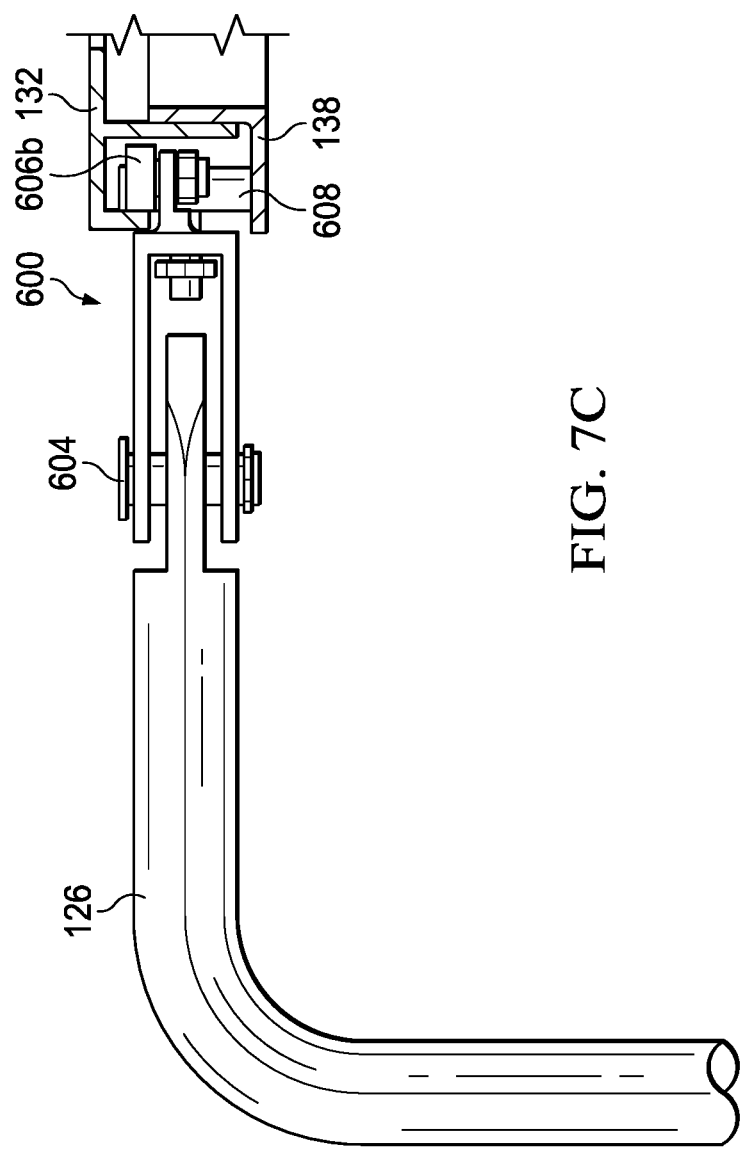

FIG. 7A is a three-dimensional view of the roller assembly 600 between the open position and the closed position. FIG. 7B is a view from above the configuration illustrated in FIG. 7A. FIG. 7C is a view a side of the configuration illustrated in FIGS. 7A and 7B (as generally indicated by the arrows labeled "7C" in FIG. 7B). The roller assembly 600 is illustrated moving along a length of the track 122 in the direction 152 toward the closed position. Each of the rollers 606a, 606b, and 608 rolls within the track to facilitate the movement. The roller 608 supports a vertical load from the arm 126 and roller assembly 600, which includes the weight of the door 124. The roller 608 transfers the vertical load to the member 138. As the roller assembly 600 translates along the track 122, the angle of the arm 126 is fixed due to being rigidly attached to the door 124. A relative angle between the arm 126 and the roller assembly 600 changes based on the roller assembly 600 pivoting, about the pivotal attachment 604, to move around the curve of the track 122 to reach the closed position.

Figure 8A:
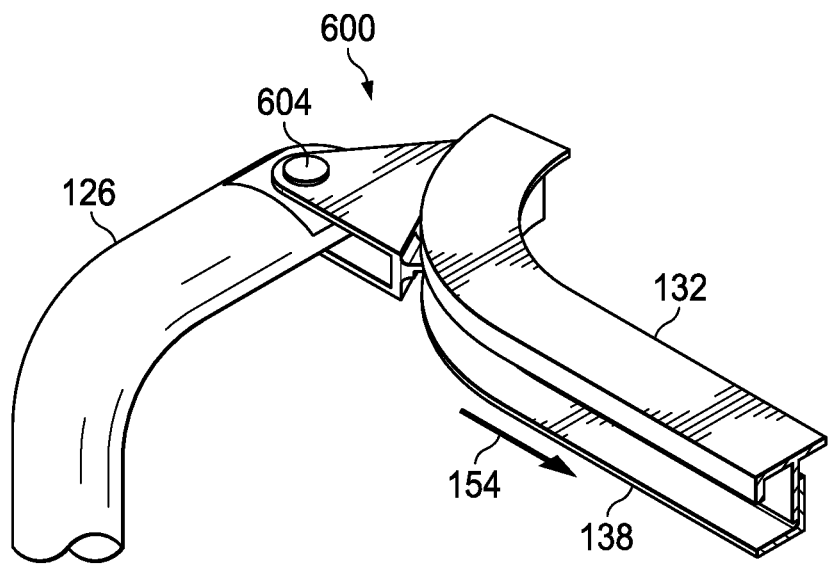
Figure 8B:
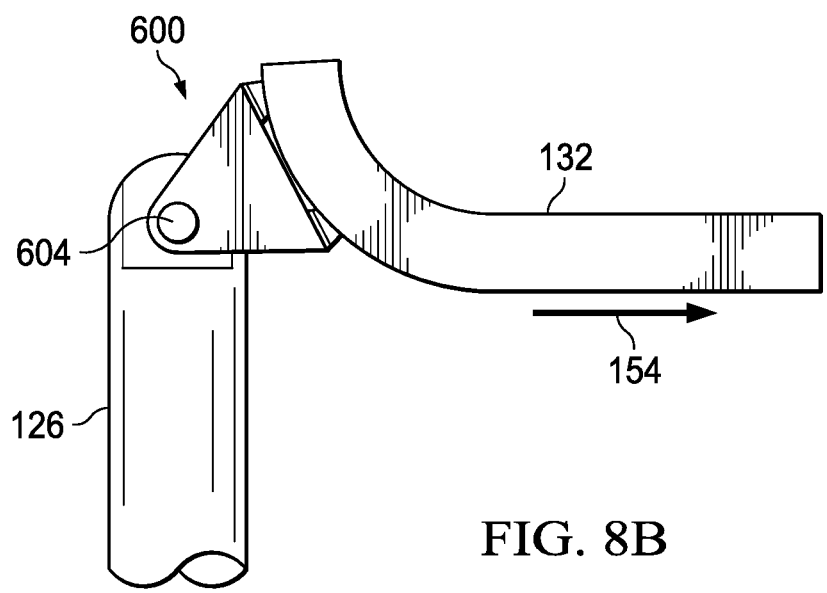

FIG. 8A is a three-dimensional view of the arm 126 and the roller assembly 600 in the closed position. FIG. 8B is a view from above the configuration as illustrated in FIG. 8A. The roller assembly 600 is illustrated moving along a length of the track 122 in the direction 154 from the closed position toward the open position. Again, the angle of the arm 126 is fixed due to being rigidly attached to the door 124. Because the angle of the arm 126 is fixed, the relative angle between the arm 126 and the roller assembly 600 changes based on the roller assembly 600 pivoting, about the pivotal attachment 604, to move around the curve of the track 122 away from the closed position and toward the open position.

FIG. 9 is a cutaway view of the second medial portion 164 of the track 122. The arm 126b is attached to the door 124 at one end and is pivotally coupled to a roller assembly (e.g., roller assembly 600) at an opposite end. The roller assembly 600 nests into rails in the second medial portion 164 of the track 122. The second medial portion 164 includes the members 136, 139, 140, 142, and 144 (not shown in FIG. 9). The member 142 is fastened to the fuselage 107 of the rotorcraft and provides support for the members 139 and 140. The member 139 is an angle section comprising a first flange 139a and a second flange 139b. The flanges 139a and 139b are approximately perpendicular to one another. The first flange 139a is attached to and enclosed between the members 140 and 142. The second flange 139b extends outward from the member 142 and forms a lower rail for supporting the roller assembly. The member 140 is a T-shaped section comprising a top flange 140a, a medial flange 140b, and a reinforcing flange 140c. The top flange 140a of the member 140 forms an upper rail for supporting the roller assembly. The reinforcing flange 140c increases the load bearing capacity of the member 140 and partially encloses a channel into which the roller assembly nests. The second medial portion 164 is fastened to and, at least in part, coplanar with the first medial portion 162 to create a level walking surface with structural load bearing capacity to support step loads. Advantageously, the members 136, 139, 140, 142, and 144 form a set of rails operable to guide movement of the door 124, provide structural support for step loads, and form the aerodynamic surface, which reduces drag associated with the track 122.

The roller assembly, the arm 126b, and members 136, 139, 140, and 142 of the second medial portion 164 (Figures in 9 and 10) are similar in form and operation to the roller assembly 600, the arm 126a, and members 130, 138, 132, and 143 the first medial portion 162 (FIGS. 4, 5, and 6); the description of each of these components is not repeated here only for the sake of brevity. A difference is that the second medial portion 164 includes the member 144.

FIGS. 10 and 11 are cutaway views showing cut through the member 144 of the second medial portion 164 of the track 122. The member 144 is fastened to upper surfaces of the members 140 and 142. The member 144 creates a change in vertical elevation of the track 122. The member 144 is at a higher elevation, by a distance D1, than a plane in which the upper surfaces of the members 136, 140, and 142 lie. For example, the plane has a first vertical elevation and the member 144 has a second vertical elevation that is higher than the first elevation by the distance D1. The member 144 includes a tapered section 145, which tapers in width and elevation to match the width and elevation of the members 136, 140, and 142. In some examples, the change in elevation accommodates a moveable fairing. For example, the fairing 121b (of FIGS. 1A and 1B) may hinge open and/or closed from a bottom edge. When the fairing is open, it rests on the track 122. The track 122 has structural capacity to support loads from the fairing. The track 122 supports a bottom surface of the fairing the first vertical elevation and a top surface of the faring at the second elevation. In such an example, the change in elevation created by the member 144 creates a flat walking surface that is continuous with the fairing when the fairing is open and can reduce the likelihood of a person stumbling when walking between the fairing and the track 122.

Embodiments of the present disclosure are not limited to having such a change in vertical elevation. Such a change in vertical elevation of the track is, in some embodiments, dependent on a shape of the OML of the aircraft. In the Figures, the OML of the rotorcraft dips inward as you move further aft on the aircraft. In other embodiments, for example, where the OML is straight, the vertical change in elevation may be omitted and a flat surface maintained along the entire length of the track.

FIG. 11 illustrates further details of a handhold 146 in the member 144. The handhold 146 comprises a recession, which is operable to support a hand of a person and a weight of the person. Because the track 122 is elevated along the side of the rotorcraft 101 and each of the portions of the track 122 are configured to support step loads, the handhold 146 facilitates a user pulling themselves up to and/or down from the elevation of the track 122. A sidewall of the handhold 146 includes a recession 146a to accommodate a person's fingertips. The recession 146a in the sidewall can help improve the efficacy of a person gripping the handhold 146 and therefore reduce the likelihood of the person losing grip while ascending to and/or descending from the track 122.

FIG. 12 is a cutaway view showing a cut through the member 150 of the second end portion 166 of the track 122. The member 150 is attached by fasteners to the fuselage 107 of the rotorcraft 101. The member 150 forms a portion of the outer mold line of the rotorcraft 101. As is shown in FIG. 2, the member 150 tapers toward its aft end to create an aerodynamic surface to reduce drag associated with the track 122. In addition, as is shown in FIG. 12, a top surface 150a of the member 150 is reinforced to support step loads. For example, the top surface 150a is thicker than the side surface 150b. The forward end of the member 150 is fastened to member 144 of the second medial portion 164 of the track 122.

Several embodiments of the present disclosure utilize a certain number of members, such as angle sections, and T-shaped sections, to integrate various features into a track. However, embodiments of the present disclosure are not limited to the specific number of member in the illustrated embodiments. The number of members can vary between different embodiments. For example, some embodiments may be implemented using more, less, and/or other member than those illustrated in the Figure. Moreover, some embodiments may consolidate two or more of the members into a single member. In addition, several embodiments of the present disclosure refer to and show fasteners. Such fasteners are inclusive of screws, nuts, bolts, welds or any other mechanical fasteners for attaching two or more components to one another.

Although several embodiments have been illustrated and described in detail, numerous other changes, substitutions, variations, alterations, and/or modifications are possible without departing from the spirit and scope of the present disclosure, as defined by the appended claims. The embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. An apparatus comprising:
   a track comprising a plurality of members coupled to one another, the plurality of members comprising:
   a first member operable to couple the track to an aircraft;
   a second member forming a first rail; and
   a third member forming a second rail, wherein the third member comprises at least a portion of an outer mold line of the aircraft and is operable to support a step load and the first rail and the second rail are operable to guide movement of an aircraft component.

2. The apparatus of claim 1, further comprising:
   a roller assembly comprising a roller, wherein the roller assembly nests between the first rail and the second rail and the roller assembly is operable to move along the track based on the roller rolling along the first rail and the second rail;
   an arm operable to support the aircraft component; and
   a pivotal attachment to pivotally attach the roller assembly and the arm.

3. The apparatus of claim 1, wherein the track extends along a length of the aircraft.

4. The apparatus of claim 1, further comprising a recession in the track, the recession forming a handhold operable to support a hand of a person and a weight of the person.

5. The apparatus of claim 1, where the track comprises a change in vertical elevation.

6. The apparatus of claim 5, where the track has a first vertical elevation at a first location along a length of the aircraft and a second vertical elevation at a second location along the length of the aircraft and the second vertical elevation is higher than the first vertical elevation.

7. The apparatus of claim 6, further comprising a movable fairing, wherein the track is operable to support the movable fairing and, when supported by the track, a bottom surface of the movable fairing is supported at the second vertical elevation, a top surface of the movable fairing is supported at the first vertical elevation.

8. The apparatus of claim 1, wherein:
the first member comprises a first angle section;
the second member comprises a second angle section; and
the third member comprises a T-shaped section.

9. A system comprising:
an aircraft component; and
a track comprising a plurality of members coupled to one another, the plurality of members comprising:
    a first member operable to couple the track to an aircraft;
    a second member forming a first rail; and
    a third member forming a second rail, wherein the third member comprises at least a portion of an outer mold line of the aircraft and is operable to support a step load and the first rail and the second rail are operable to guide movement of the aircraft component.

10. The system of claim 9, a roller assembly comprising a roller, wherein the roller assembly nests between the first rail and the second rail and the roller assembly is operable to move along the track based on the roller rolling along the first rail and the second rail;
an arm operable to support the aircraft component; and
a pivotal attachment to pivotally attach the roller assembly and the arm.

11. The system of claim 9, further comprising a recession in the track, the recession forming a handhold operable to support a hand of a person and a weight of the person.

12. The system of claim 9, where the track comprises a change in vertical elevation.

13. The system of claim 12, where the track has a first vertical elevation at a first location along a length of the aircraft and a second vertical elevation at a second location along the length of the aircraft and the second vertical elevation is higher than the first vertical elevation.

14. The system of claim 13, further comprising a movable fairing, wherein the track is operable to support the movable fairing and, when supported by the track, a bottom surface of the movable fairing is supported at the second vertical elevation, a top surface of the movable fairing is supported at the first vertical elevation.

15. An aircraft comprising:
a door; and
a track comprising a plurality of members coupled to one another, the plurality of members comprising:
    a first member operable to couple the track to the aircraft;
    a second member forming a first rail; and
    a third member forming a second rail, wherein the third member comprises at least a portion of an outer mold line of the aircraft and is operable to support a step load and the first rail and the second rail are operable to guide movement of the door.

16. The aircraft of claim 15, a roller assembly comprising a roller, wherein the roller assembly nests between the first rail and the second rail and the roller assembly is operable to move along the track based on the roller rolling along the first rail and the second rail;
an arm operable to support the door; and
a pivotal attachment to pivotally attach the roller assembly and the arm.

17. The aircraft of claim 15, further comprising a recession in the track, the recession forming a handhold operable to support a hand of a person and a weight of the person.

18. The aircraft of claim 15, where the track comprises a change in vertical elevation.

19. The aircraft of claim 18, where the track has a first vertical elevation at a first location along a length of the aircraft and a second vertical elevation at a second location along the length of the aircraft and the second vertical elevation is higher than the first vertical elevation.

20. The aircraft of claim 19, further comprising a movable fairing, wherein the track is operable to support the movable fairing and, when supported by the track, a bottom surface of the movable fairing is supported at the second vertical elevation, a top surface of the movable fairing is supported at the first vertical elevation.

* * * * *